United States Patent
Massari et al.

(10) Patent No.: US 9,000,097 B2
(45) Date of Patent: Apr. 7, 2015

(54) POLYPROPYLENE COMPOSITION

(75) Inventors: Paola Massari, Ferrara (IT); Marco Ciarafoni, Ferrara (IT); Tiziana Caputo, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/128,382

(22) PCT Filed: Jul. 6, 2012

(86) PCT No.: PCT/EP2012/063200
§ 371 (c)(1), (2), (4) Date: Dec. 20, 2013

(87) PCT Pub. No.: WO2013/004804
PCT Pub. Date: Jan. 10, 2013

(65) Prior Publication Data
US 2014/0155554 A1   Jun. 5, 2014

Related U.S. Application Data

(60) Provisional application No. 61/505,489, filed on Jul. 7, 2011.

(30) Foreign Application Priority Data

Jul. 7, 2011 (EP) ................................. 11172949

(51) Int. Cl.
   *C08L 23/10* (2006.01)
   *C08L 23/14* (2006.01)
(52) U.S. Cl.
   CPC   *C08L 23/14* (2013.01); *C08L 23/10* (2013.01)

(58) Field of Classification Search
   CPC ..... C08L 23/10; C08L 23/14; C08L 23/0815; C08L 2205/02; C08L 2312/02
   USPC .......................................................... 525/240
   See application file for complete search history.

(56) References Cited

U.S. PATENT DOCUMENTS

| 5,280,074 A | 1/1994 | Schreck et al. | |
| 5,641,848 A * | 6/1997 | Giacobbe et al. | 526/348.1 |
| 8,835,568 B2 * | 9/2014 | Ciarafoni et al. | 525/191 |
| 2012/0035327 A1 * | 2/2012 | Ciarafoni et al. | 525/240 |

FOREIGN PATENT DOCUMENTS

| WO | WO01/199915 A1 | 3/2001 |
| WO | WO2004/011507 A1 | 2/2004 |

OTHER PUBLICATIONS

PCT International Search Report & Written Opinion mailed Oct. 8, 2012, for PCT/EP2012/063200.

\* cited by examiner

*Primary Examiner* — Nathan M Nutter

(57) ABSTRACT

A polyolefin composition comprising (percent by weight):
A) from 65% to 75% of a propylene homopolymer or a propylene copolymer containing from 0.1% to 5.0% of ethylene derived units having a fraction soluble in Xylene at 25° C. lower than 3 wt %;
B) from 25% to 35% of an ethylene copolymer containing from 3% to 12% of propylene derived units;
said composition having a melt flow rate (MFR) determined according to ISO method 1133 (230° C. and 2.16 kg) comprised between 11 g/10 min and 50 g/10 min; the xylene soluble fraction ranging from 3% to 15% and the intrinsic viscosity (IV) of the xylene soluble fraction ranging from 0.8 dl/g to 2 dl/g.

10 Claims, No Drawings

POLYPROPYLENE COMPOSITION

This application is the U.S. National Phase of PCT International Application PCT/EP2012/063200, filed Jul. 6, 2012, claiming priority of European Patent Application No. 11172949.7, filed Jul. 7, 2011, and the benefit under 35 U.S.C. 119(e) of U.S. Provisional Application No. 61/505, 489 filed Jul. 7, 2011, the contents of which are incorporated herein by reference in their entirety.

FIELD OF THE INVENTION

The present invention relates to a polyolefin composition having particular features and being particularly suitable for injection molding.

BACKGROUND OF THE INVENTION

To improve the toughness of propylene polymers and in particular to improve the toughness in the temperature range below 0° C., it is customary to add polymers which are non-crystalline or have a low crystallinity, e.g. ethylene-propylene copolymers, as impact modifiers to propylene polymers. It has been found to be most economical if the impact-modified propylene polymers are prepared directly in a multistage polymerization process. Such products are referred to as high-impact propylene copolymers, as multiphase propylene copolymers, as heterophase propylene copolymers or as propylene block copolymers. The less soft propylene polymer, which normally makes up the largest proportion by weight of the polymer composition, usually forms a physically coherent phase which is referred to as the matrix.

EP-A 918 068 discloses blends of polypropylene and finely divided polyethylene for the production of stiff and transparent films. The polyethylene content does not exceed 10% by weight.

U.S. Pat. No. 5,280,074 relates to a polypropylene molding composition comprising:
(1) 20 to 99% by weight of a crystalline polymer containing at least 95% by weigh of propylene and
(2) 1 to 80% by weight of a non crystalline ethylene-propylene copolymer having an ethylene content of 20% to 90% by weight.

WO 2004/011507 relates to propylene polymer composition comprising a propylene homopolymer or a propylene copolymer comprising at least 85% of propylene and an ethylene copolymer containing at least 90% by weight of ethylene. The ethylene copolymer ranges from 10 to 50% by weight in the composition and the propylene polymer composition has a melt flow rate of from 2 to 50 g/10 min.

SUMMARY OF THE INVENTION

The applicant found that by selecting particular features it is possible to still improve the duttle/brittle temperature, the Izod impact strength at low temperatures and the whitening resistance of a composition comprising propylene-based polymer and ethylene-based polymer composition.

An object of the present invention is a polyolefin composition comprising (percent by weight):
A) from 65% to 75% preferably from 67% to 73%; more preferably from 68% to 72% of a propylene homopolymer or a propylene copolymer containing from 0.1% to 5.0% of ethylene derived units having a fraction soluble in Xylene at 25° C. lower than 3 wt %; preferably lower than 2.5 wt %

B) from 25% to 35% preferably from 27% to 33%, more preferably from 28% to 32% of an ethylene copolymer containing from 3% to 12% preferably from 3% to 10% of propylene derived units;
said composition having a melt flow rate (MFR) determined according to ISO method 1133 (230° C. and 2.16 kg) comprised between 11 g/10 min and 50 g/10 min; preferably between 12 g/10 min and 40 g/10 min; more preferably between 12 g/10 min and 35 g/10 min; the xylene soluble fraction ranging from 3% to 15%; preferably from 4% to 10%; and the intrinsic viscosity (IV) of the xylene soluble fraction ranging from 0.8 dl/g to 2 dl/g; preferably from 0.9 dl/g to 1.5 dl/g; more preferably from 0.9 dl/g to 1.3 dl/g.

DETAILED DESCRIPTION OF THE INVENTION

The term "copolymer" as used herein refers to polymers with two different recurring units in the chain.

In one preferred embodiment component A) has a melt flow rate (MFR) determined according to ISO method 1133 (230° C. and 2.16 kg) comprised between 11 g/10 min and 28 g/10 min; preferably comprised between 15 g/10 min and 25 g/10 min; even more preferably comprised between 17 g/10 min and 22 g/10 min; and component B) has a content of propylene derived units ranging from 4 wt % to 15 wt %; preferably from 6 wt % to 13 wt %; more preferably from 7 wt % to 12 wt % by weight; said composition has a xylene soluble fraction comprised between 6 wt % and 15 wt %, more preferably comprised between 7 wt % and 13 wt %; said composition having a melt flow rate (MFR) determined according to ISO method 1133 (230° C. and 2.16 kg) comprised between 10 g/10 min and 30 g/10 min; preferably comprised between 10 g/10 min and 20 g/10 min.

In one preferred embodiment in the propylene composition component A) has a melt flow rate (MFR) determined according to ISO method 1133 (230° C. and 2.16 kg) comprised between 29 g/10 min and 50 g/10 min; preferably comprised between 31 g/10 min and 40 g/10 min; even more preferably comprised between 32 g/10 min and 27 g/10 min; and component B) has a content of propylene derived units ranging from 1 wt % to 7 wt %; preferably from 2 wt % to 6 wt %; more preferably from 3 wt % to 5 wt % by weight; said composition has a xylene soluble fraction comprised between 2 wt % and 10 wt % %, more preferably comprised between 3 wt % and 6 wt %; said composition having a melt flow rate (MFR) determined according to ISO method 1133 (230° C. and 2.16 kg) comprised between 20 g/10 min and 40 g/10 min; preferably comprised between 25 g/10 min and 35 g/10 min.

The composition of the present invention is especially suitable for injected molding applications, especially for obtaining articles to be used at low temperature. In fact the ductile/brittle temperature (D/B TT) is preferably lower than −15° C.; more preferably lower than −18° C.; even more preferably lore than −22° C.; The Izod impact strength at 0° C. is higher than 1.6 KJ/m$^2$; preferably it is higher than 1.8 KJ/m$^2$; more preferably higher than 2.2. The Izod impact strength at −20° C. is higher than 1.3 KJ/m$^2$.

Furthermore the propylene composition object of the present invention shows good values of whitening resistance.

The propylene composition of the present invention show also good values of hexane extractables. They are lower than 2 wt %, preferably lower than 1.9 wt %. This renders the composition object of the present ivnention useful for the production of containers for coking.

The composition of the present invention can be obtained by mechanically blending component A) and component B)

or by means of a sequential copolymerization process. Said process comprising at least two sequential polymerization stages with each subsequent polymerization stage being conducted in the presence of the polymeric material formed in the immediately preceding polymerization reaction. In order to separate the two polymerization zones devices such as these described in WO 2008/058839 are used. The polymerisation stages may be carried out in the presence of a stereospecific Ziegler-Natta catalyst.

According to a preferred embodiment, all the polymerisation stages are carried out in the presence of a catalyst comprising a trialkylaluminium compound, optionally an electron donor, and a solid catalyst component comprising a halide or halogen-alcoholate of Ti and an electron-donor compound supported on anhydrous magnesium chloride. Catalysts having the above-mentioned characteristics are well known in the patent literature; particularly advantageous are the catalysts described in U.S. Pat. No. 4,399,054 and EP-A-45 977. Other examples can be found in U.S. Pat. No. 4,472,524.

Preferably the polymerisation catalyst is a Ziegler-Natta catalyst comprising a solid catalyst component comprising:

a) Mg, Ti and halogen and an electron donor (internal donor),
b) an alkylaluminum compound and, optionally (but preferably),
c) one or more electron-donor compounds (external donor).

The internal donor is preferably selected from the esters of mono or dicarboxylic organic acids such as benzoates, malonates, phthalates and certain succinates. They are described in U.S. Pat. No. 4,522,930, European patent 45977 and international patent applications WO 00/63261 and WO 01/57099, for example. Particularly suited are the phthalic acid esters and succinate acids esters. Alkylphthalates are preferred, such as diisobutyl, dioctyl and diphenyl phthalate and benzyl-butyl phthalate.

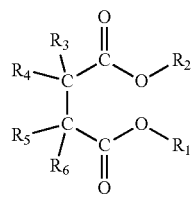

Among succinates, they are preferably selected from succinates of formula (I) below:

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to, or different from, each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen, $R_6$ is a radical selected from primary branched, secondary or tertiary alkyl groups, cycloalkyl, aryl, arylalkyl or alkylaryl groups having from 3 to 20 carbon atoms; or of formula (II) below:

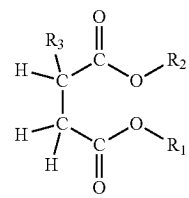

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms and the radical $R_3$ is a linear alkyl group having at least four carbon atoms optionally containing heteroatoms.

The Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio be from 1 to 1000.

The external donor (c) can be of the same type or it can be different from the succinates of formula (I) or (II). Suitable external electron-donor compounds include silicon compounds, ethers, esters such as phthalates, benzoates, succinates also having a different structure from those of formula (I) or (II), amines, heterocyclic compounds and particularly 2,2,6,6-tetramethylpiperidine, ketones and the 1,3-diethers of the general formula (III):

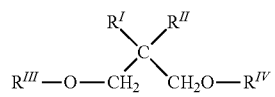

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Preferred electron-donor compounds that can be used as external donors include aromatic silicon compounds containing at least one Si—OR bond, where R is a hydrocarbon radical. A particularly preferred class of external donor compounds is that of silicon compounds of formula $R_a^7 R_b^8 Si(OR^9)_c$, where a and b are integers from 0 to 2, c is an integer from 1 to 3 and the sum (a+b+c) is 4; $R^7$, $R^8$, and $R^9$, are $C_1$-$C_{18}$ hydrocarbon groups optionally containing heteroatoms. Particularly preferred are the silicon compounds in which a is 1, b is 1, c is 2, at least one of $R^7$ and $R^8$ is selected from branched alkyl, alkenyl, alkylene, cycloalkyl or aryl groups with 3-10 carbon atoms optionally containing heteroatoms and $R^9$ is a $C_1$-$C_{10}$ alkyl group, in particular methyl. Examples of such preferred silicon compounds are cyclohexyltrimethoxysilane, t-butyltrimethoxysilane, t-hexyltrimethoxysilane, cyclohexylmethyldimethoxysilane, 3,3,3-trifluoropropyl-2-ethylpiperidyl-dimethoxysilane, diphenyldimethoxysilane, methyl-t-butyldimethoxysilane, dicyclopentyldimethoxysilane, 2-ethylpiperidinyl-2-t-butyldimethoxysilane, (1,1,1-trifluoro-2-propyl)-methyldimethoxysilane and (1,1,1-trifluoro-2-propyl)-2-ethylpiperidinyldimethoxysilane. Moreover, are also preferred the silicon compounds in which a is 0, c is 3, $R^8$ is a branched alkyl or cycloalkyl group, optionally containing heteroatoms, and $R^9$ is methyl. Particularly preferred specific examples of silicon compounds are (tert-butyl)$_2$Si(OCH$_3$)$_2$, (cyclohexyl) (methyl) Si(OCH$_3$)$_2$, (phenyl)$_2$Si(OCH$_3$)$_2$ and (cyclopentyl)$_2$Si(OCH$_3$)$_2$.

Preferably the electron donor compound (c) is used in such an amount to give a molar ratio between the organoaluminum compound and said electron donor compound (c) of from 0.1 to 500, more preferably from 1 to 300 and in particular from 3 to 100.

As explained above, the solid catalyst component comprises, in addition to the above electron donors, Ti, Mg and halogen. In particular, the catalyst component comprises a titanium compound, having at least a Ti-halogen bond and the above mentioned electron donor compounds supported on a Mg halide. The magnesium halide is preferably MgCl$_2$ in active form, which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerisation of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds are TiCl$_4$ and TiCl$_3$; furthermore, also Ti-haloalcoholates of formula Ti(OR)n-yXy can be used, where n is the valence of titanium, y is a number between 1 and n, X is halogen and R is a hydrocarbon radical having from 1 to 10 carbon atoms.

The preparation of the solid catalyst component can be carried out according to several methods, well known and described in the art.

According to a preferred method, the solid catalyst component can be prepared by reacting a titanium compound of formula Ti(OR)n-yXy, where n is the valence of titanium and y is a number between 1 and n, preferably TiCl$_4$, with a magnesium chloride deriving from an adduct of formula MgCl$_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles.

Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermally controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The electron donor compound(s) can be added during the treatment with TiCl$_4$.

Regardless of the preparation method used, the final amount of the electron donor compound(s) is preferably such that the molar ratio with respect to the MgCl$_2$ is from 0.01 to 1, more preferably from 0.05 to 0.5.

The said catalyst components and catalysts are described in WO 00/63261 and WO 01/57099.

The catalysts may be pre-contacted with small quantities of olefin (pre-polymerisation), maintaining the catalyst in suspension in a hydrocarbon solvent, and polymerising at temperatures from ambient to 60° C., thus producing a quantity of polymer from 0.5 to 3 times the weight of the catalyst. The operation can also take place in liquid monomer, producing, in this case, a quantity of polymer 1000 times the weight of the catalyst.

By using the above mentioned catalysts, the polyolefin compositions are obtained in spheroidal particle form, the particles having an average diameter from about 250 to 7,000 microns, a flowability of less than 30 seconds and a bulk density (compacted) greater than 0.4 g/ml.

The polymerisation stages may occur in liquid phase, in gas phase or liquid-gas phase. Preferably, the polymerisation of component A) is carried out in liquid monomer (e.g. using liquid propylene as diluent), while the copolymerisation stages of component B) is preferably carried out in gas phase. Alternatively, the sequential polymerisation stages can be carried out in gas phase.

The reaction temperature in the polymerisation stages is preferably from 40 to 100° C.; more preferably, the reaction temperature ranges from 50 to 80° C. in the preparation of component A), and from 70 to 100° C. for the preparation of component B).

The pressure of the polymerisation stage to prepare component A), if carried out in liquid monomer, is the one which competes with the vapour pressure of the liquid propylene at the operating temperature used, and it may be modified by the vapour pressure of the small quantity of inert diluent used to feed the catalyst mixture, by the overpressure of optional monomers and by the hydrogen used as molecular weight regulator. The polymerisation pressure preferably ranges from 33 to 43 bar, if done in liquid phase, and from 5 to 30 bar if done in gas phase. Conventional molecular weight regulators known in the art, such as chain transfer agents (e.g. hydrogen or ZnEt$_2$), may be used.

Conventional additives, fillers and pigments, commonly used in olefin polymers, may be added, such as nucleating agents, extension oils, mineral fillers, and other organic and inorganic pigments. In particular, the addition of inorganic fillers, such as talc, calcium carbonate and mineral fillers, also brings about an improvement of some mechanical properties, such as flexural modulus and HDT. Talc can also have a nucleating effect.

The nucleating agents are preferably added to the compositions of the present invention in quantities ranging from 0.05 to 2% by weight, more preferably from 0.1 to 1% by weight with respect to the total weight.

EXAMPLES

The following examples, intend to illustrate, without limiting, the present invention.

The following analytical methods have been used to determine the properties reported in the detailed description and in the examples.

Ethylene: By IR spectroscopy.

The spectrum of a pressed film of the polymer is recorded in absorbance vs. wavenumbers (cm$^{-1}$). The following measurements are used to calculate C2 content:

a) Area ($A_t$) of the combination absorption bands between 4482 and 3950 cm$^{-1}$ which is used for spectrometric normalization of film thickness.

b) Area ($A_{C2}$) of the absorption band due to methylenic sequences (CH$_2$ rocking vibration) after a proper digital subtraction of an isotactic polypropylene (IPP) reference spectrum. The range 660 to 790 cm$^{-1}$ is used for both heterophasic and/or random copolymers Fractions soluble and insoluble in xylene at 25° C.: 2.5 g of polymer are dissolved in 250 mL of xylene at 135° C.

under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble and insoluble at room temperature (25° C.).

Intrinsic Viscosity [η]: Measured in tetrahydronaphthalene at 135° C.

Molecular weight ($\overline{M}_n$, $\overline{M}_w$, $\overline{M}_z$): Measured by way of gel permeation chromatography (GPC) in 1,2,4-trichlorobenzene.

Determination of isotactic pentads content: 50 mg of each xylene insoluble fraction were dissolved in 0.5 mL of $C_2D_2Cl_4$. The $^{13}C$ NMR spectra were acquired on a Bruker DPX-400 (100.61 Mhz, 90° pulse, 12 s delay between pulses). About 3000 transients were stored for each spectrum; mmmm pentad peak (21.8 ppm) was used as reference. The microstructure analysis was carried out as described in literature (Polymer, 1984, 25, 1640, by Inoue Y. et Al. and Polymer, 1994, 35, 339, by Chujo R. et Al.).

Polydispersity index: Measurement of molecular weight distribution of the polymer. To determine the PI value, the modulus separation at loss modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI=54.6\times(\text{modulus separation})^{-1.76}$$

wherein the modulus separation (MS) is defined as:

$$MS=(\text{frequency at } G'=500 \text{ Pa})/(\text{frequency at } G''=500 \text{ Pa})$$

wherein G' is the storage modulus and G" is the loss modulus.

Melt flow rate: Determined according to ISO method 1133 (230° C. and 2.16 kg).

Flexural modulus: Determined according to ISO method 178.

Izod impact resistance: Determined according to ISO method 180/1A.

Izod impact resistance: Determined according to ISO method 180/1A.

Stress-Whitening Resistance:

The resistance to whitening is determined by subjecting to the impact of a ram having a 76 g weight, small discs which have a 4 cm diameter and prepared by injection moulding, prepared from the polymer being tested. Both the minimum height (h) up to the maximum height allowed by the apparatus necessary to obtain whitening, and the width (diameter) of the whitened area are recorded.

Hexane Extratables

The proportion of n-hexane-soluble material was determined by extraction using a modified FDA method. About 2.5 g of polymer granules were weighed out and suspended in 1 L of n-hexane. The suspension was heated to 50° C.±0.2° C. over a period of 20-25 minutes while stirring and stirred for a further 2 hours at this temperature. The suspension was filtered through a glass frit which had been preheated to 50° C. About 350 g of the filtrate were weighed into an evaporator flask which had previously been dried over $P_2O_5$ in a desiccator for 12 hours. The filtrate was evaporated to about 20-30 ml at 60° C. under reduced pressure on a rotary evaporator. The solution was transferred quantitatively with the aid of several rinses with warm hexane into a 200 ml evaporating basin which had previously been dried over $P_2O_5$ in a desiccator for 12 hours and weighed. The solution was evaporated to dryness on a hotplate while passing nitrogen over it. After evaporation, the evaporating basin was dried over $P_2O_5$ at 200 mbar in a desiccator for 12 hours, weighed and the extraction residue was determined. The same procedure was repeated without addition of polymer granules and the residue in pure n-hexane was determined. The residue in pure n-hexane was subtracted to determine the proportion of material which is extracted by n-hexane.

Comparative Examples 1 and 2 and Example 3 and 4

Preparation of the Solid Catalyst Component

Into a 500 ml four-necked round flask, purged with nitrogen, 250 ml of $TiCl_4$ are introduced at 0° C. While stirring, 10.0 g of microspheroidal $MgCl_2.1.9C_2H_5OH$ (prepared according to the method described in ex.2 of U.S. Pat. No. 4,399,054 but operating at 3000 rpm instead of 10000 rpm) and 9.1 mmol of diethyl 2,3-(diisopropyl)succinate are added. The temperature is raised to 100° C. and maintained for 120 min. Then, the stirring is discontinued, the solid product was allowed to settle and the supernatant liquid is siphoned off. Then 250 ml of fresh $TiCl_4$ are added. The mixture is reacted at 120° C. for 60 min and, then, the supernatant liquid is siphoned off. The solid is washed six times with anhydrous hexane (6×100 ml) at 60° C.

Catalyst System and Pre-Polymerization Treatment The solid catalyst component described above was contacted at 12° C. for 24 minutes with aluminium triethyl (TEAL) and dicyclopentyldimethoxysilane (DCPMS) as outside-electron-donor component. The weight ratio between TEAL and the solid catalyst component and the weight ratio between TEAL and DCPMS are specified in Table 1.

The catalyst system is then subjected to pre-polymerization by maintaining it in suspension in liquid propylene at 20° C. for about 5 minutes before introducing it into the first polymerization reactor.

Polymerization

The polymerisation run is conducted in continuous in a series of two reactors equipped with devices to transfer the product from one reactor to the one immediately next to it. Polymer (A) is prepared in the first reactor described in EP 1 012 195. The catalyst is sent to the polymerisation apparatus that comprises two interconnected cylindrical reactors, riser and downcomer. Fast fluidisation conditions are established in the riser by recycling gas from the gas-solid separator. Polymer (B) is prepared in the second reactor that is a fluid bed gas phase reactors. The device described in WO 2008/058839 is used between the first and second reactor in order to separate the monomers to be polymerized. Temperature and pressure are maintained constant throughout the course of the reaction. Hydrogen is used as molecular weight regulator. The gas phase (propylene, ethylene and hydrogen) is continuously analysed via gas-chromatography. At the end of the run the powder is discharged and dried under a nitrogen flow. Then the polymer particles are introduced in an extrusion, wherein they are mixed with 8500 ppm of talc, 1500 ppm of Irganox B 215 (made of 1 part of Irganox 1010 and 2 parts of Irgafos 168) and 500 ppm of Ca stearate, to obtain a nucleated composition. The previously said Irganox 1010 is pentaerytrityl tetrakis 3-(3,5-di-tert-butyl-4-hydroxyphenyl)propanoate, while Irgafos 168 is tris(2,4-di-tert-butylphenyl) phosphite, btoh marketed by Ciba-Geigy. The polymer particles are extruded under nitrogen atmosphere in a twin screw extruder, at a rotation speed of 250 rpm and a melt temperature of 200-250° C.

In Table 1 the polymerization conditions are reported.

TABLE 1

Polymerization Process

| | | Example | | | |
|---|---|---|---|---|---|
| | | Comparative ex 1 | Comparative ex 2 | Ex 3 | Ex 4 |
| Component A) | | | | | |
| TEAL/external donor | wt/wt | 8 | 9 | 9 | 9 |
| TEAL/catalyst | wt/wt | 8 | 8 | 8 | 8 |
| Temperature | °C. | 75 | 75 | 75 | 75 |
| Pressure | bar-g | 28 | 28 | 28 | 28 |
| Split holdup riser | wt % | 40 | 40 | 40 | 40 |
| downcomer | wt % | 60 | 60 | 60 | 60 |
| $H_2/C_3$ riser | mol/mol | 0.037 | 0.037 | 0.042 | 0.1 |
| MFR | g/10 min | 14 | 14 | 17 | 63 |
| XS | wt % | 2 | 1.9 | 2 | 1.9 |
| Tm | °C. | 162 | 161.3 | 162.1 | 161.8 |
| Component B) | | | | | |
| Temperature | °C. | 90 | 90 | 90 | 90 |
| Pressure | MPa | 1.6 | 1.6 | 2.3 | 2.3 |
| Split | % | 20 | 20 | 29 | 30 |
| $C_2/C_2 + C_3$ | mol/mol | 0.93 | 0.88 | 0.87 | 0.88 |
| $H_2/C_2^-$ | mol/mol | 0.18 | 0.182 | 0.19 | 0.175 |
| C2 copolymer* | Wt % | 98 | 93 | 91 | 95.6 |

XS = xylene soluble fraction at 25° C.
$H_2$ = hydrogen; $C_2$ = ethylene; $C_3$ = propylene.
*calculated The Polymers of Examples 1-4 have been Analyzed, the Result are Reported in Table 2

| | | Comparative ex 1 | Comparative ex 2 | Ex 3 | Ex 4 |
|---|---|---|---|---|---|
| C2 tot | % wt | 19.2 | 18.5 | 27.6 | 28.4 |
| Xylene Soluble | % wt | 2.6 | 5.0 | 8.1 | 5.0 |
| XS-IV | dl/g | 0.9 | 1.08 | 1.04 | 1.13 |
| MFR | g/10' | 11.4 | 10.5 | 12.3 | 32.5 |
| Flexural Modulus | MPa | 1605 | 1657 | 1420 | 1457 |
| Izod at 0° C. | $kJ/m^2$ | 1.3 | 1.6 | 2.5 | 1.9 |
| Izod at −20° C. | $kJ/m^2$ | 1.2 | 1.3 | 1.4 | 1.4 |
| Hexane extractables | | Nd | nd | 1.1 | 1.7 |
| D/B TT | °C. | −1.0 | 5.8 | −20.0 | −24.0 |
| Whithening resistance: diameter (mm) of the whitening area due to a ram (76 g) falling from a heigh of | 76 cm height mmx10 | 110 | 110 | 100 | 100 |
| | 30 cm height mmx10 | 90 | 80 | 70 | 70 |
| | 20 cm height mmx10 | 80 | 70 | 60 | 60 |
| | 10 cm height mmx10 | 50 | 40 | 30 | 30 |
| | 5 cm height mmx10 | 40 | 20 | 0 | 0 |

XS-IV intrinsic viscosity of the xylene soluble fraction at 25° C.
$H_2$ = hydrogen;
$C_2$ = ethylene;
$C_3$ = propylene
Nd = not determined
From table 2 clearly results the improved value of izod at low temperature, D/B TT and whitening resistance of the examples according to the invention.

What is claimed is:

1. A polyolefin composition comprising (percent by weight):
   A) from 65% to 75% of a propylene homopolymer or a propylene copolymer containing from 0.1% to 5.0% of ethylene derived units, such homopolymer or copolymer having a fraction soluble in Xylene at 25° C. lower than 3 wt %;
   B) from 25% to 35% of an ethylene copolymer containing from 3% to 12% of propylene derived units;
   said composition having a melt flow rate (MFR) determined according to ISO method 1133 (230° C. and 2.16 kg) comprised between 11 g/10 min and 50 g/10 min, a xylene soluble fraction ranging from 3% to 15% by weight and an intrinsic viscosity (IV) of the xylene soluble fraction ranging from 0.8 dl/g to 2 dl/g.

2. The polyolefin composition according to claim 1 comprising (percent by weight) from 67% to 73% of component A) and from 27% to 33% of component B).

3. The polyolefin composition according to claim 1 having a melt flow rate (MFR) determined according to ISO method 1133 (230° C. and 2.16 kg) comprised between 12 g/10 min and 40 g/10 min.

4. The polyolefin composition according to claim 1 having the xylene soluble fraction ranging from 3 wt % to 15 wt %.

5. The polyolefin composition according to claim 1 having the intrinsic viscosity (IV) of the xylene soluble fraction ranging from 0.9 dl/g to 1.5 dl/g.

6. The polyolefin composition according to claim 1 wherein the component B) has a content of propylene derived units ranging from 4 wt % to 15 wt %; and the whole composition having a melt flow rate (MFR) determined according to ISO method 1133 (230° C. and 2.16 kg) comprised between 11 g/10 min and 28 g/10 min.

7. The polyolefin composition according to claim 6 having a xylene soluble fraction comprised between 6 wt % and 15 wt %.

8. The polyolefin composition according to claim 1 wherein the component B) has a content of propylene derived units ranging from 1 wt % to 7 wt %; and the whole composition having a melt flow rate (MFR) determined according to ISO method 1133 (230° C. and 2.16 kg) comprised between 29 g/10 min and 50 g/10 min.

9. The polyolefin composition according to claim 6 having a xylene soluble fraction comprised between 2 wt % and 10 wt %.

10. Injection moulded articles comprising the polyolefin composition of claim 1.

* * * * *